(12) United States Patent
Niina

(10) Patent No.: US 6,833,706 B2
(45) Date of Patent: Dec. 21, 2004

(54) HOLE DISPLACEMENT MEASURING SYSTEM AND METHOD USING A MAGNETIC FIELD

(75) Inventor: Nobuyoshi Niina, Sugar Land, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 10/065,146

(22) Filed: Sep. 20, 2002

(65) Prior Publication Data

US 2003/0184305 A1 Oct. 2, 2003

Related U.S. Application Data

(60) Provisional application No. 60/369,134, filed on Apr. 1, 2002.

(51) Int. Cl.$^7$ .................................................. G01V 3/00
(52) U.S. Cl. ............................. 324/346; 33/544; 33/542
(58) Field of Search ......................... 33/558.2, 558.04, 33/783, 542, 544, 544.1; 324/346, 207.26, 221

(56) References Cited

U.S. PATENT DOCUMENTS

| | | | |
|---|---|---|---|
| 3,284,701 A | | 11/1966 | Kerbow |
| 3,886,665 A | * | 6/1975 | Lowen ........................ 33/544 |
| 4,205,266 A | * | 5/1980 | Lichtenberg ................. 324/221 |
| 4,289,025 A | * | 9/1981 | Norel et al. ............. 73/152.17 |
| 4,350,955 A | | 9/1982 | Jackson et al. |
| 4,355,378 A | | 10/1982 | Dennis et al. |
| 4,407,157 A | | 10/1983 | Lichtenberg |
| 4,492,922 A | * | 1/1985 | Ohkubo .................. 324/207.21 |
| 4,709,208 A | | 11/1987 | Kerr |
| 5,019,978 A | | 5/1991 | Howard, Jr. et al. |
| 5,099,236 A | | 3/1992 | Kyle et al. |
| 5,142,225 A | * | 8/1992 | Gerlach et al. ......... 324/207.21 |
| 5,493,216 A | * | 2/1996 | Asa ........................... 324/207.2 |
| 5,522,260 A | | 6/1996 | Chappellat et al. |
| 5,541,587 A | | 7/1996 | Priest |
| 5,546,672 A | | 8/1996 | Campbell et al. |
| 5,581,024 A | | 12/1996 | Meyer, Jr. et al. |
| 5,896,939 A | | 4/1999 | Witte |
| 6,065,219 A | * | 5/2000 | Murphey et al. .............. 33/544 |
| 6,091,238 A | * | 7/2000 | McDermott ............... 324/207.2 |
| 6,647,637 B2 | * | 11/2003 | Lechen ......................... 33/544 |
| 6,674,280 B1 | * | 1/2004 | Goetz et al. ........... 324/207.21 |

FOREIGN PATENT DOCUMENTS

| | | | |
|---|---|---|---|
| GB | 2376079 A | | 12/2002 |
| SU | 1574804 A | * | 6/1990 |

OTHER PUBLICATIONS

Search Report Under Section 17 dated Jul. 21, 2003 for GB0306505.9.

* cited by examiner

Primary Examiner—Jay Patidar
(74) Attorney, Agent, or Firm—Victor H. Segura; Brigitte L. Echols; John Ryberg

(57) ABSTRACT

Techniques for measuring a displacement include generating a magnetic field using a magnetic field source; measuring a first magnitude of a component of the magnetic field using a sensor disposed within the magnetic field; displacing the magnetic field source; measuring a second magnitude of the component of the magnetic field using the sensor; determining a distance that the magnetic field source is displaced using the first magnitude and the second magnitude. An apparatus for measuring a radius of a hole includes a support member having at least one arm, each having a first end and a second end, the first end attached to the support member; a magnet moveably attached to the support member via the second end of the each of the at least one arm; and a first magnetic sensor fixed to the support member. An apparatus of the invention may further include a second and third sensors.

20 Claims, 6 Drawing Sheets

HOLE DISPLACEMENT MEASURING SYSTEM AND METHOD USING A MAGNETIC FIELD

CROSS REFERENCE TO RELATED APPLICATIONS

This invention claims benefit of provisional U.S. application Ser. No. 60/369,134, filed on Apr. 1, 2002.

BACKGROUND OF INVENTION

This invention relates to techniques for measuring a displacement using a magnetic field source and a sensor disposed within the magnetic field. The invention is applicable in any field permitting the generation of a magnetic field and the taking of measurements as specified herein. Though not limited to any specific field, the invention has particular use in subsurface measurements.

Accurate borehole dimension data are important for both the measurement of earth formation parameters penetrated by the borehole and completion of the well after drilling. Borehole dimension data from successive trips in the borehole can be used to monitor wellbore conditions such as early indications of borehole washout and impending wellbore instability. Information regarding dimensions can allow a driller to take remedial actions during the drilling operation to prevent damage loss of the borehole or drilling equipment. As shown in FIG. 1, once a borehole is drilled to the desired depth, it is typically "completed" with a steel casing (1) around which cement (2) is pumped thereby filling the casing-borehole annulus. Information regarding the dimension of, for example, the radius of the borehole is very useful in determining completion requirements, such as the amount of cement required to properly fill the annulus. Also, prior art logging-while-drilling (LWD) or measurement-while-drilling (MWD) systems, like their wireline counterparts, are sensitive to borehole size. Accurate dimension information is required to properly correct parametric measurements from these systems. Measuring the dimensions of a borehole, such as its radius, can be accomplished by several methods. U.S. Pat. No. 6,285,026 issued to Evans et al. is directed toward the determination of radial dimensions of a borehole by irradiating the formation with neutrons and measuring the neutron flux within the borehole.

Also known in the art are systems that measure the diameter of a borehole with a caliper tool, which uses a sensing element such as a potentiometer. Typically, these devices use spring-loaded arms to contact the borehole wall. The arms are connected to one or more elements of a potentiometer for determining the instantaneous borehole diameter. These types of caliper systems, because they are exposed to harsh downhole conditions, require pressure bulkhead and pressure sealing components to protect their parts.

There remains a need for improved borehole measurements techniques and tools that can better withstand the downhole environments.

SUMMARY OF INVENTION

The invention provides an apparatus for measuring a radius of a hole. The apparatus includes a support member having at least one arm, each at least one arm having a first end and a second end, the first end attached to the support member; a magnet moveably attached to the support member via the second end of each at least one arm; and a first magnetic sensor fixed to the support member for measuring a magnetic field of the magnet.

The invention provides a downhole tool for measuring a radius of a borehole. The tool includes a housing having an exterior surface and an interior; at least one arm, each of the at least one arm having a first end and a second end, the first end attached to the exterior surface of the housing; at least one magnet moveably attached to the exterior surface of the housing and each at least one magnet attached to the second end of each at least one arm; and a first magnetic sensor, fixed in the interior of the housing for measuring a magnetic field of the at least one magnet.

The invention provides a method for measuring a displacement. The method includes generating a magnetic field using a magnetic field source; measuring a first magnitude of a component of the magnetic field using a sensor disposed within the magnetic field; displacing the magnetic field source; measuring a second magnitude of the component of the magnetic field using the sensor; determining a distance that the magnetic field source is displaced using the first magnitude and the second magnitude.

DETAILED DESCRIPTION

The invention relates to methods and apparatuses for measuring dimensions and/or displacements. Methods for measuring displacements in accordance with the invention are based on measuring at least one component of a magnetic field and determining the location where the measurement was made. The determination of the location where the measurement was made can be accomplished by using a graph which shows the value of the magnetic component value at any location within the magnetic field.

A method according to an embodiment of the invention comprises providing a magnetic field source; measuring at least one component of the magnetic field at a location within the magnetic field of the magnetic field source; displacing the magnetic field source to a new location; measuring the at least one component of the magnetic field using the same sensor with the magnetic field source at the new location; and determining a distance that the magnetic field source is displaced. The distance that the magnetic field source is displaced may be derived from the points having the measured magnitudes of the corresponding magnetic field component in a graph that relates the magnitudes of the magnetic component at any magnetic field source location with respect to the sensor.

Figure 1:
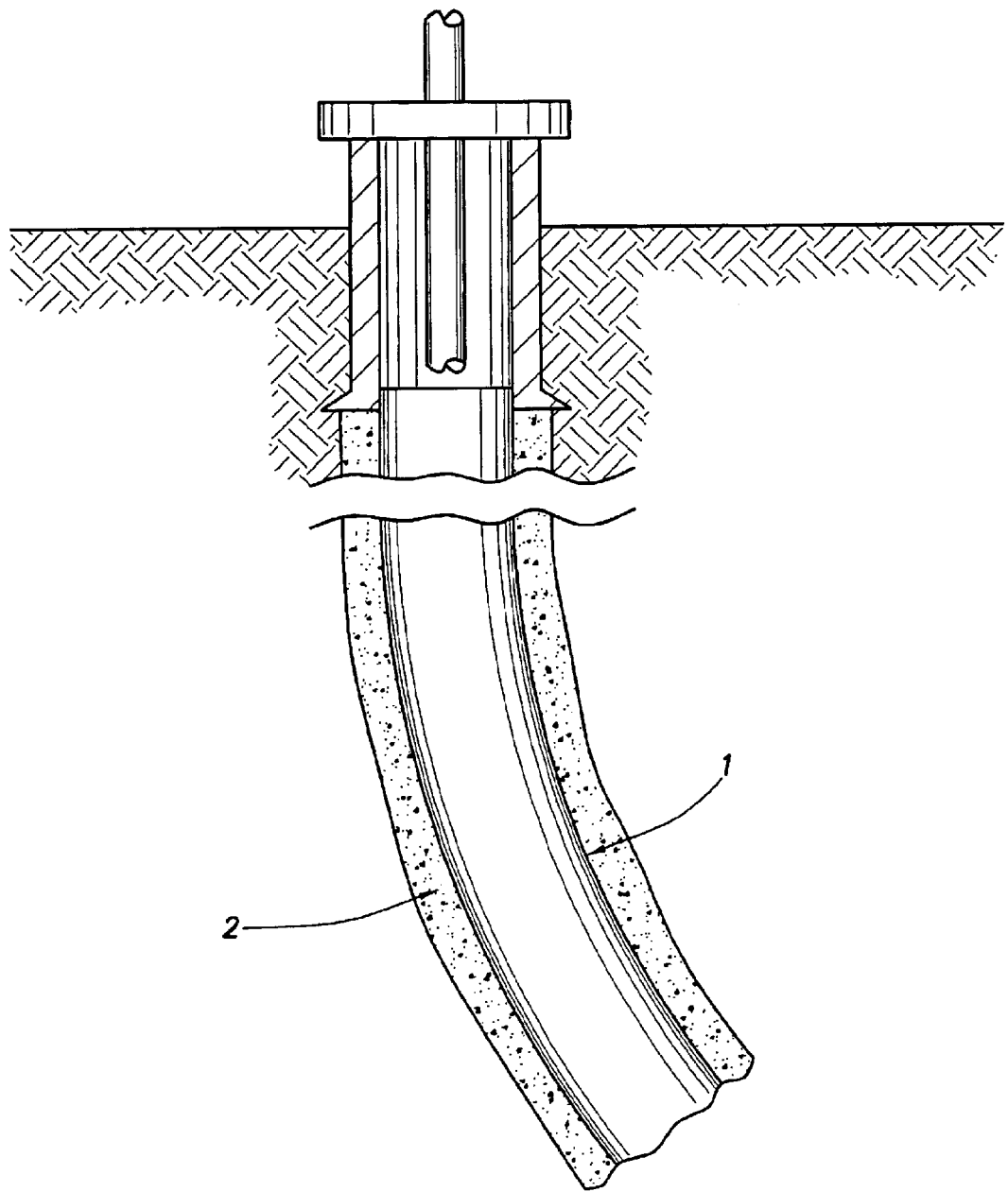
FIG. 1 is a plain view of a borehole (Prior art).
Figure 2:
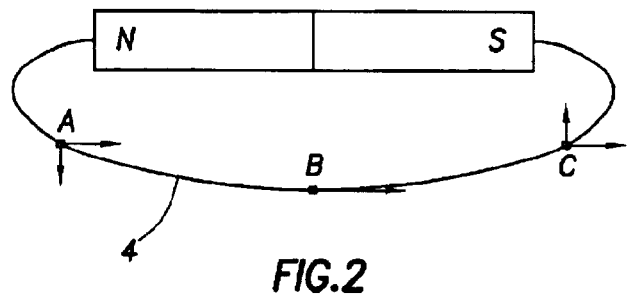
FIG. 2 is a plain view of a magnet.

As shown in FIG. 2, a magnet produces a magnetic field, which can be represented by lines of magnetic flux (4). The magnitude of the magnetic field at each point on a specific line of flux (4) is constant and can be represented by a vector of the form $B=B_x x+B_y y+B_z z$. In FIG. 2, the z component of the magnetic field is not shown. As shown in FIG. 2, the magnitudes of the magnetic field components ($B_x$ and $B_y$) vary depending on their specific locations on the specific line of magnetic flux (4). For example, in FIG. 2, point A has a negative $B_y$ magnitude, point B has a zero $B_y$ magnitude, and point C has a positive $B_y$ magnitude. Therefore, if a correlation function of, for example, $B_y$ magnitudes and x coordinates is available, it is possible to determine the magnitude of $B_y$ at any location along the x coordinate, and vice versa.

Figure 3A:
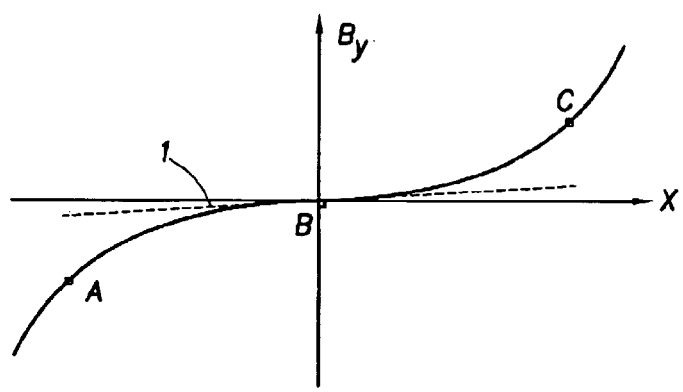
FIG. 3 is a plot of component $B_y$ of the magnetic field versus coordinate x.

FIG. 3a shows a response curve of $B_y$ components as a function of x coordinates on the line of magnetic flux (4) shown in FIG. 2. The corresponding $B_y$ values at points A, B, and C on the line of magnetic flux (4) are also shown. It is apparent that once this curve is defined, the curve can be used to provide an x coordinate on the line of magnetic flux (4) based on a $B_y$ measurement or to provide a $B_y$ magnitude based on an x coordinate on the line of magnetic flux (4). If one were to move the sensor or to move the magnet along a line parallel the x coordinate, the sensor will not stay on a single line of magnetic flux. However, a similar response function of $B_y$ magnitudes as a function of x coordinates can be constructed and in a similar fashion.

While embodiments of the invention can use non-linear functions as shown above, in preferred embodiments, displacement measurements are performed within a linear response region of the curve shown in FIG. 3a. For example, within a small range around point B the curve is approximately linear, as evidenced by the dotted line 1. Thus, if a displacement to be measured is within this range, a linear response may be assumed. In addition, more than one magnet may be used to "fine tune" the magnetic field such that the sensors will measure a linear response over wider ranges of displacement. One of ordinary skill in the art would know how to use multiple magnets for such a purpose. Similarly, a linear response over wide ranges of displacement may be obtained by optimizing the shape of a magnet.

Figure 3B:
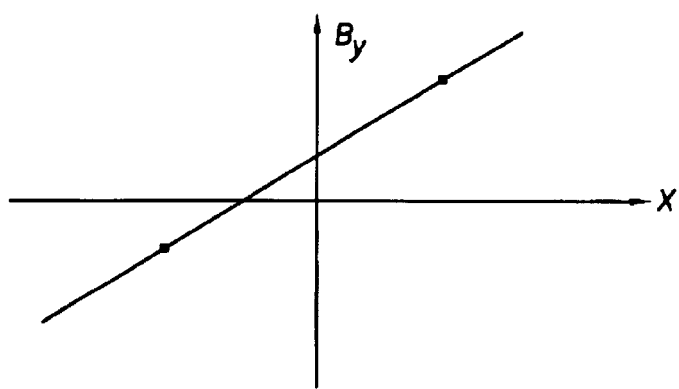

FIG. 3b illustrates a linear correlation function between $B_y$ magnitudes and x coordinates. The linear function can be defined by taking two measurements at two different locations. The two measurements can also be obtained by using two magnetic sensors spaced apart at a known distance. The slope of the line would then be directly related to the difference in the measurements detected by these two sensors. Therefore, any change in the slope of this response function (e.g., due to changes in the magnetic field strength) can be detected as a change in the difference in the measurements detected by these two sensors. Thus, in one or more embodiments of the invention, two magnetic sensors are provided to correct for any magnetic field strength changes.

While the correlation function shown in FIGS. 3a and 3b is based on a single component (e.g., $B_y$) of a magnetic field, one skilled in the art would appreciate that more than one component may be measured and similar correlation functions can be constructed. In addition, with two components (e.g., $B_x$ and $B_y$), the ratio of these two components may be used to construct the correlation function, i.e., $B_x/B_y$ versus x coordinates. Using the two components (or the ratio of the two components) makes it unnecessary to use two sensors at two different locations. The two components may be acquired with two sensors at the same location but oriented in orthogonal directions or with a sensor having dual coils in orthogonal directions. This eliminates the physical constraint in finding two linear response regions for the two sensors. In addition, correction for magnetic field strength changes becomes unnecessary when using a ratio of two components measured at the same location because any magnetic field change would affect both components by the same factor. Consequently, the ratio is substantially immune to fluctuation in the strength of the magnetic field source.

Figure 4A:
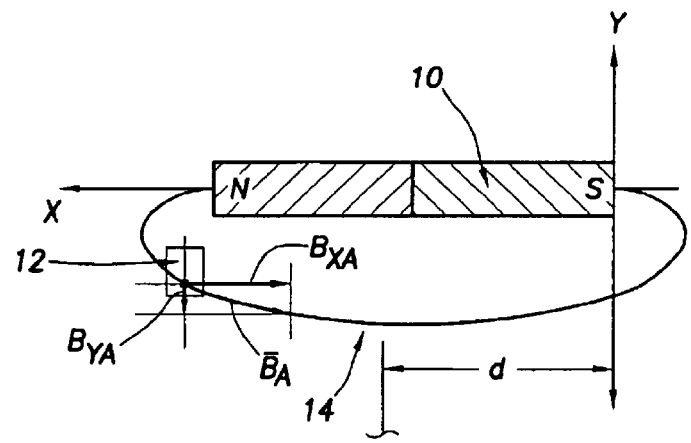
FIGS. 4a–4c illustrate a method for measuring displacement in accordance with one embodiment of the invention.
Figure 4B:
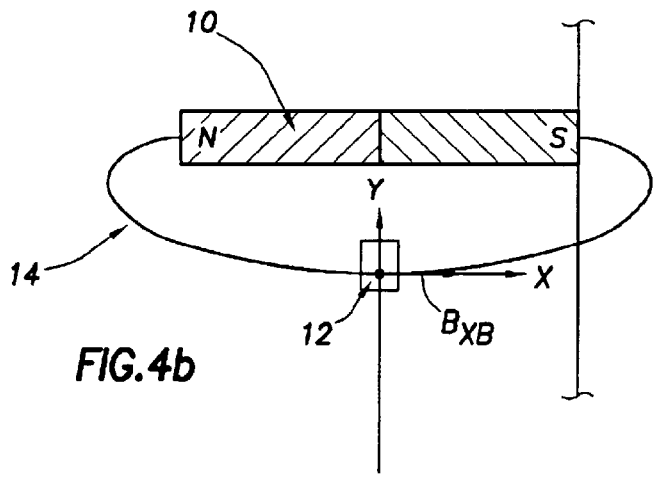
Figure 4C:
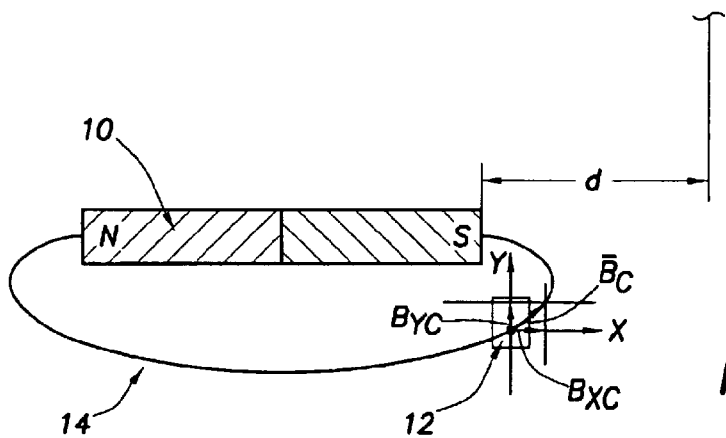

FIGS. 4a–4c illustrate a method and system for displacement measurement according to one embodiment of the invention. In a method for displacement measurement of the invention, a magnetic field source (10) is moved relative to a magnetic sensor (12), as shown in FIGS. 4a, 4b, and 4c. Using a correlation function shown in FIG. 3a or FIG. 3b, the magnitudes of the magnetic field detected by the magnetic senor (12) in various configurations shown in FIGS. 4a–4c can then be used to determine the magnitude of displacement of the magnetic field source (10).

The magnet source (10) can be any type of magnetic field source, such as, a permanent magnet or a magnet based on electric induction phenomena. The magnetic sensor (12) can be any type of sensor for measuring magnetic fields. An example of a magnetic sensor (12) is a magnetoresistive (MR) sensor. An MR sensor detects magnetic fields by resistance changes of a magnetoresistive element. The magnitudes of the signals detected by an MR sensor depend on the magnitudes and directions of magnetic flux reaching the sensor. One type of MR sensor is made of a nickel-iron thin film deposited on a silicon wafer and patterned as a Wheatstone bridge. This type of MR sensor has a field sensing range of about±2 gauss (G) [1 G=$10^{-4}$ tesla] with low hysteresis and a high degree of linearity.

The displacement measuring system shown in FIG. 4 is based on measuring magnitudes of at least one component of the magnetic field (e.g., $B_x$ or $B_y$). In accordance with this embodiment, a magnetic sensor (12) measures at least one component (e.g., $B_y$) of a magnetic field at two or more locations. The measured magnitudes of the magnetic field component together with the linear function shown in FIG. 3b can provide the locations of the magnetic sensor (12) on the x coordinate with respect to the magnet source (10). Similarly, it is possible to determine the location of the magnetic field source (10) with respect to the magnetic sensor (12) if the magnetic field source is moved along the x coordinate.

Figure 5:
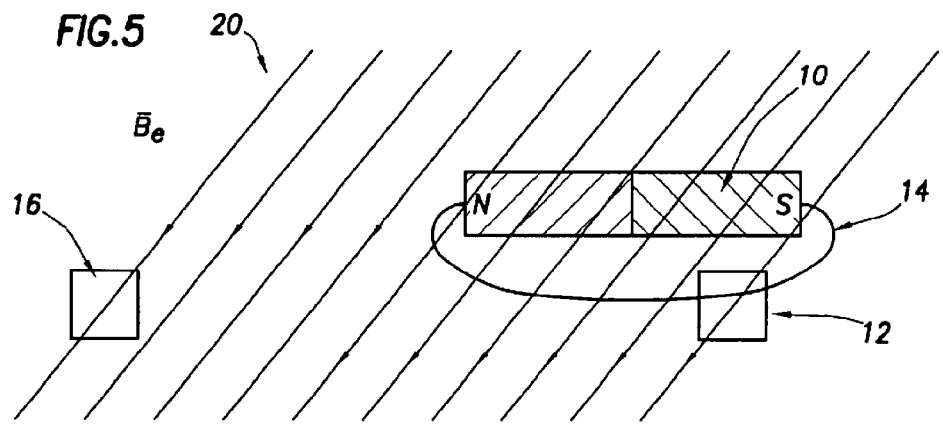
FIG. 5 is a plane view of a displacement measuring system according to one embodiment of the invention.

FIG. 5 shows another embodiment of the invention that includes an additional magnetic sensor (16) for measuring an external magnetic field not produced by the magnetic field source (10). The additional magnetic sensor (16) is located at a distance such that it is substantially unaffected by the magnetic field produced by the magnetic field source (10) in its sensing direction. Note that the additional magnetic sensor (16) does not have to be outside of the influence of the magnetic field source (10) per se. Instead, it is only necessary that in the sensing direction (e.g., $B_x$, $B_y$, or $B_z$) of the additional magnetic sensor (16), the influence of the magnetic field source (10) is substantially negligible. The external magnetic field (20) can be, for example, the earth's magnetic field or any other magnetic fields such as a secondary magnetic field induced by the eddy currents that result from the magnetic field source (10) in earth formations. The measurements made by the magnetic sensor (12)

include the magnetic field from the external magnetic field (20). Therefore, the magnitudes of $B_y$ measurements shown in FIG. 3b include the external magnetic field (20). Subtracting the external magnetic field (20) detected by the magnetic sensor (16) the measurements made by the magnetic sensor (12) will produce a measurement solely due to the magnetic field source (10).

Figure 6:
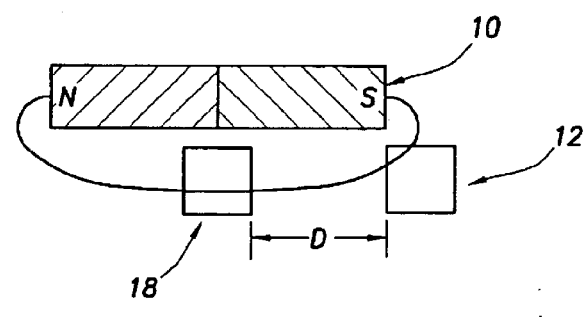
FIG. 6 is a plane view of a displacement measuring system according to one embodiment of the invention.

FIG. 6 shows another embodiment of the invention that includes a magnetic field source (10), a first magnetic sensor (12), and a second magnetic sensor (18). The second magnetic sensor (18) is located at a known distance D from the first magnetic sensor (12). The arrangement shown in FIG. 6 provides at two separate locations the magnitudes of at least one magnetic field component. As stated above, measurements of the magnetic field component, for example $B_y$, at two locations separated by a known distance may be used to construct a correlation function as shown in FIG. 3b. Therefore, the embodiment, as shown in FIG. 6, makes it possible to correct the measurements made by the first magnetic sensor (12) and the second magnetic sensor (18), if the magnetic field from the magnetic field source (10) changes.

In case that the relationship between the magnitude of the $B_y$ component and the x coordinate is non-linear, it will be necessary to measure more than two points in order to define their relationship. In this case, according to one embodiment of the invention, more than two magnetic sensors may be provided at different locations in order to correct the measurement, when the magnetic field from the magnetic field source (10) changes.

Moreover, a third magnetic sensor (16) may be added to the embodiment as shown in FIG. 6 in order to account for any external magnetic field not produced by the magnetic field source (10).

Figure 7:
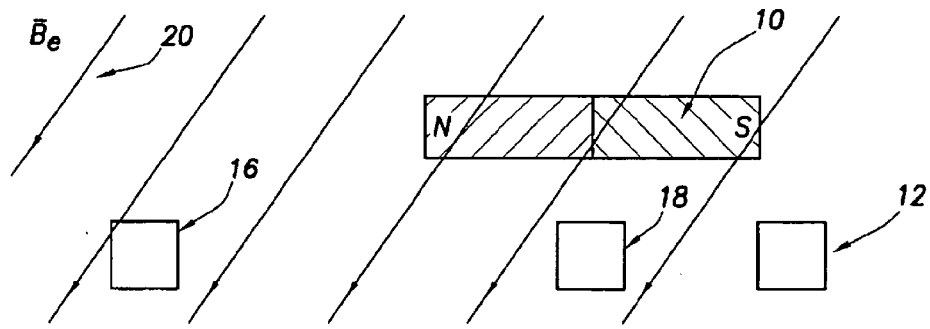
FIG. 7 is a plane view of a displacement measuring system according to one embodiment of the invention.

FIG. 7 shows an embodiment of the invention having a first magnetic sensor (12), a second magnetic sensor (16), and a third magnetic sensor (18). According to this embodiment, the displacement of either the magnetic field source (10) or the magnetic sensors may be measured. For example, displacement of the magnetic field source (10) may be measured with the magnetic sensors (12, 16, 18) fixed. In another embodiment of the invention, the magnetic field source (10) is fixed, and the magnetic sensors (12, 16, 18) are moved relative to the magnetic field source (10).

Figure 8:
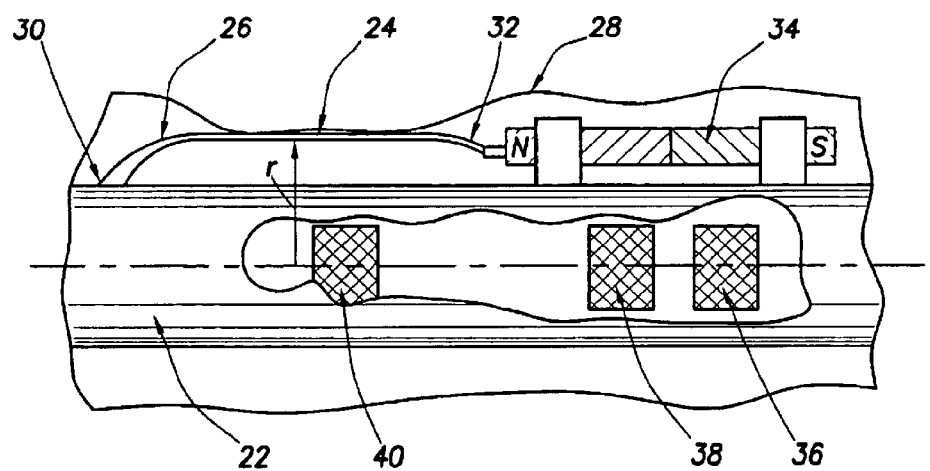
FIG. 8 shows an apparatus for measuring hole size in accordance with one embodiment of the invention.

Moreover, one embodiment of the invention includes an apparatus for measuring the dimensions of a hole, as shown in FIG. 8. For example, a dimension that can be measured is the radius of the hole. The apparatus includes, for example, a support member (22) having one or more arms (24). The arms (24) can be, for example, bow-spring members (26) which are fixedly set in an extended position from the support member (i.e. non-articulated) and forced against the sidewall (28) of the hole. One end (30) of each bow-spring member is attached to the support member (22), while the other end (32) is attached to the magnetic field source (34) that is movably attached to the support member (22). As shown in FIG. 8, the arm (24) will change its curvature depending on the radius of the hole. The change in curvature will displace the magnetic field source (34). Such displacement will be measured by the first magnetic sensor (36) and the second magnetic sensor (38). The change of the curvature of the arm can be derived from the magnitude of the magnetic field source (34) displacement. The radius (r) of the hole is then determined from the curvature of the arm.

Embodiments of the invention measure the relative displacement between the magnetic field source and the magnetic sensors. Such measurements may be accomplished with either the magnetic field source or the magnetic sensors fixed in position. Thus, according to another embodiment of the invention, the first magnetic sensor (36) and the second magnetic sensor (38) are fixed to the arm (24) and moveably attached to the support member (22), while the magnetic field source (34) is fixed to the support member (22).

Figure 9:
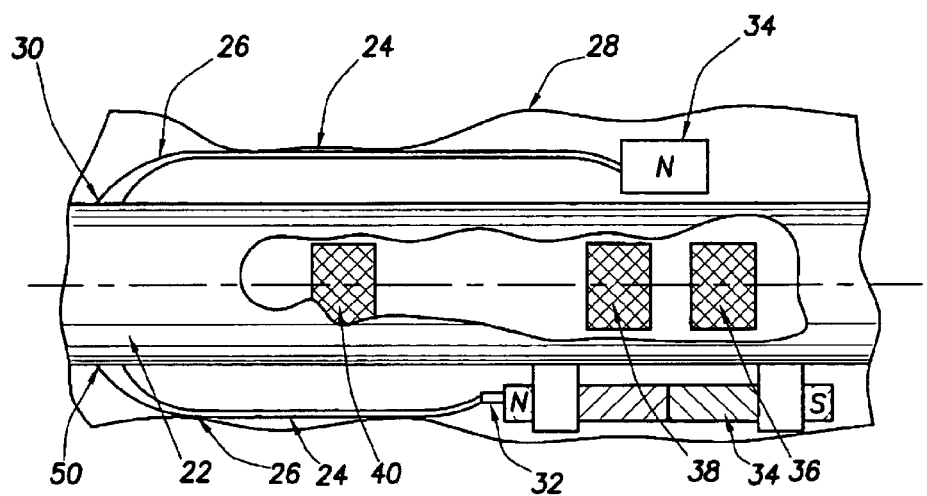
FIG. 9 shows an apparatus for measuring hole size in accordance with one embodiment of the invention.

Moreover, an apparatus according to embodiments of the invention may include more than one arm. For example, a plurality of arms (24), each having an attached magnetic field source (34), may be attached to the support member (22). FIG. 9 shows one such embodiment with two arms (24) and two magnetic field sources (34) arranged in orthogonal directions. The orthogonal arrangement of the magnetic field sources minimizes interferences between the two fields. In this particular arrangement, the first sensor (36), the second sensor (38), and the third sensor (40) are each a dual function sensor capable of sensing two orthogonal components of the magnetic fields. Alternatively, two independent sets of sensors may be used to measure each magnetic field independently.

Figure 10:
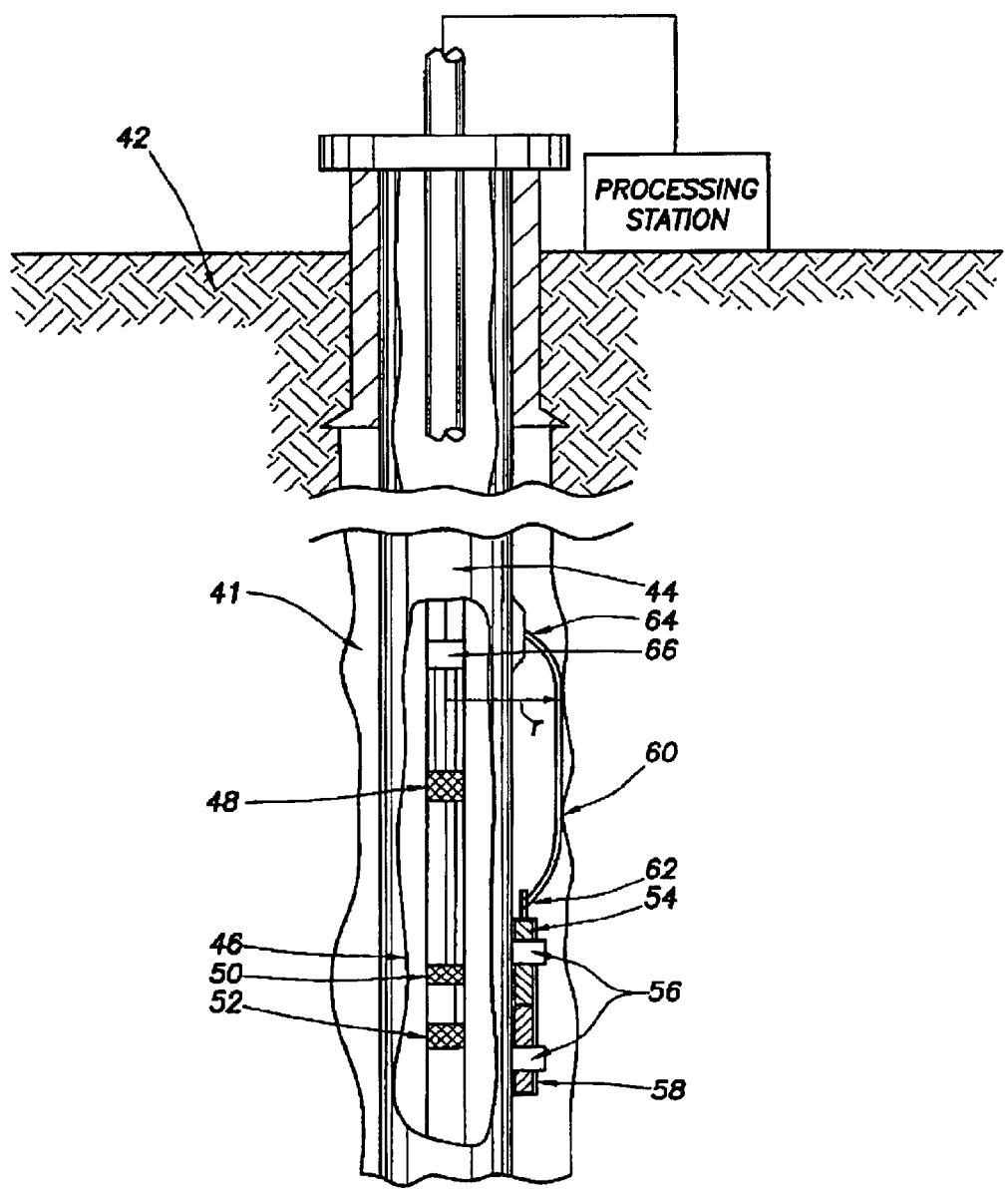
FIG. 10 shows a downhole tool in accordance with one embodiment of the invention.

FIG. 10 shows a borehole (41) penetrating an earth formation (42). A downhole tool (44) is lowered into the borehole (41). The downhole tool (44) may be a wireline tool or a logging or measuring-while-drilling tool. The downhole tool (44) includes a displacement measurement system of the invention. In accordance with one embodiment of the invention, a first magnetic sensor (50), a second magnetic sensor (52), and a third magnetic sensor (48) are located inside the downhole tool housing (46) and the magnetic field source (54) is placed outside the housing (46). The magnetic field source (54) is moveably attached to the housing (46) through couplings (56). Also, the magnetic field source (54) way be placed within an enclosure (58) to avoid direct contact with the downhole fluids. The magnetic field source (54) is attached to one end (62) of the arm (60), while the other end (64) of the arm (60) is attached to the housing (46). As stated above, the radius (r) of the borehole is determined through the geometric relations that exist between the radius of borehole, the curvature of the arm (60), and the magnetic field source (54) displacement. In another embodiment of the invention, the magnetic field source (54) is located inside the housing (44) and the magnetic sensors (48, 50, 52) are placed outside the housing.

FIG. 10 shows a total of three magnetic sensors (48, 50, 52). The third magnetic sensor (48) measures any external magnetic field not produced by the magnetic field source (10) and, therefore, is useful when there are external magnetic fields, such as the earth magnetic field. In downhole tools, the magnetic sensor (48) is important because the tool orientation is unknown. As a result, the specific component (e.g., $B_y$) of the earth magnetic field is unknown. In the absence of an external magnetic field, magnetic sensor (48) may be omitted.

The downhole tool shown in FIG. 10 includes the first magnetic sensor (50) and the second magnetic sensor (52) for measuring the magnetic field of the magnetic field source (54). The presence of the first and second magnetic sensors (50, 52) makes it possible to compensate for any changes in the magnetic field strength due to, for example, temperature and/or pressure variations. If the magnetic field strength of the magnetic field source (54) remains constant, a single magnetic sensor will suffice.

Referring again to FIG. 10, the electronic circuitry and a power supply (66) provide the required electric energy to the magnetic sensors (48, 50, 52) and also can store or forward the magnetic sensors' measurements to the processing station. The processing station includes hardware and software to process the measured data in order to provide the borehole's radius. Data communication between the downhole sensor and the processing station can be accomplished using any of the well-known telemetry techniques. Alternatively, acquired data may be stored in memory downhole for later processing if desired.

It will be apparent to those of ordinary skill in the art having the benefit of this disclosure that the invention may be implemented by programming one or more suitable general-purpose computers having appropriate hardware. The programming may be accomplished through the use of one or more program storage devices readable by the computer processor and encoding one or more programs of instructions executable by the computer for performing the operations described above. The precise forms of the program storage device and of the encoding of instructions are immaterial here.

The displacement measurement systems of the invention have several advantages. For example, by selecting a proper geometry of the magnetic field source and/or its magnetic field strength as well as the locations of the magnetic sensors relative to the magnetic field source, the spacing between the magnetic field source and the magnetic sensors can be adjusted such that it is greater than the thickness of the housing wall of the tool. Then, the magnetic field source may be placed outside the tool housing and the magnetic sensors inside the housing, or vice versa, without any connection between the magnetic field source and magnetic sensors. This will eliminate the need for a pressure bulkhead connector, a pressure compensation system, and sealing components, which are required in prior art devices.

For the purposes of this specification it will be clearly understood that the word "comprising" means "including but not limited to", and that the word "comprises" has a corresponding meaning.

While the invention has been described with respect to a limited number of embodiments, those skilled in the art, having the benefit of this disclosure, will appreciate that other embodiments can be devised which do not depart from the scope of the invention as disclosed herein. For example, embodiments of the invention having two sensors may be implemented with two sensors at the same location but in orthogonal directions or with a single sensor having two coils oriented in orthogonal directions.

What is claimed is:

1. An apparatus for measuring a radius of a hole, comprising:
   a support member having at least one non-articulated arm, each at least one arm having a first end and a second end, the first end rigidly attached to the support member;
   a magnet moveably attached to the support member via the second end of each at least one arm;
   a first magnetic sensor fixed to the support member for measuring a magnetic field of the magnet;
   a second magnetic sensor fixed to the support member for measuring a magnetic field of the magnet; and
   a third magnetic sensor fixed to the support, such that it is substantially unaffected by the magnetic field of the magnet in its direction of sensing, for measuring a magnetic field not produced by the magnet to distinguish the influence on the first or second sensor due solely to the magnetic field of the magnet.

2. The apparatus of claim 1, wherein the first magnetic sensor is adapted to measure a component of the magnetic field.

3. The apparatus of claim 1, wherein the first magnetic sensor is a magnetoresistive sensor.

4. The apparatus of claim 1, wherein the magnet is a permanent magnet.

5. The apparatus of claim 1, wherein the first and second magnetic sensors are spaced apart at a known distance, and the second magnetic sensor is adapted to measure the component of the magnetic field measured by the first magnetic sensor.

6. The apparatus of claim 1, wherein the first and second magnetic sensors are each dual function sensors adapted to measure orthogonal components of the magnetic field of the magnet.

7. The apparatus of claim 1, wherein the first magnetic sensor and the second magnetic sensor comprise magnetoresistive sensors.

8. The apparatus of claim 1, wherein the third magnetic sensor comprises a magnetoresistive sensor.

9. A downhole tool for measuring a radius of a borehole, comprising:
   a housing having an exterior surface and an interior;
   at least one non-articulated arm, each of the at least one arm having a first end and a second end, the first end rigidly attached to the exterior surface of the housing;
   at least one permanent magnet moveably attached to the exterior surface of the housing and each at least one permanent magnet attached to the second end of each at least one non-articulated arm;
   a first magnetic sensor, fixed in the interior of the housing for measuring a magnetic field of the at least one permanent magnet; and
   a second magnetic sensor fixed within the housing, such that it is substantially unaffected by the magnetic field of the at least one permanent magnet in its direction or sensing, for measuring a magnetic field not produced by the at least one permanent magnet to distinguish the influence on the first sensor due solely to the magnetic field of the at least one permanent magnet.

10. The downhole tool of claim 9, wherein the first magnetic sensor is adapted to measure a component of the magnetic field.

11. The downhole tool of claim 9, wherein the first magnetic sensor comprises a magnetoresistive sensor.

12. The downhole tool of claim 9, wherein each of the at least one permanent magnet is in a protective enclosure.

13. The downhole tool of claim 9, further comprising a third magnetic sensor, fixed in the interior of the housing for measuring the magnetic field of the at least one permanent magnet.

14. The downhole tool of claim 13, wherein the first and third magnetic sensors are spaced apart at a known distance and the third magnetic sensor is adapted to measure the component of the magnetic field measured by the first magnetic sensor.

15. The downhole tool of claim 13, wherein the first and third magnetic sensors are each dual function sensors adapted to measure orthogonal components of the magnetic field of the at least one permanent magnet.

16. The downhole tool of claim 13, wherein the third magnetic sensor comprises a magnetoresistive sensor.

17. The downhole tool of claim 9, wherein the second magnetic sensor comprises a magnetoresistive sensor.

18. The downhole tool of claim 13, wherein the downhole tool is one selected from a logging-while-drilling tool, a measurement-while-drilling tool, and a wireline tool.

19. A method for measuring the radius of a subsurface borehole comprising:

disposing a downhole tool within the borehole;

generating a magnetic field using a magnetic field source mounted on the downhole tool;

measuring a first magnitude of a component of the magnetic field using a first sensor mounted on the downhole tool and disposed within the magnetic field;

displacing the magnetic field source by moving the downhole tool along the borehole;

measuring a second magnitude of the component of the magnetic field using a second sensor mourned on the downhole tool and disposed within the magnetic field;

distinguishing the influence on the first or second sensor, due solely to the magnetic field source from the influence of a magnetic field not produced by said magnetic field source, using a third sensor mounted on the downhole tool; and determining a distance that the magnetic field source is displaced using the first magnitude and the second magnitude.

20. The method according to claim 19, wherein the calculating the distance comprises using a function of magnitudes of the component of the magnetic field with respect to distances between the sensors and the magnetic field source.

* * * * *